United States Patent
Choi et al.

(10) Patent No.: US 11,056,926 B2
(45) Date of Patent: Jul. 6, 2021

(54) RECEIVING COIL AND FOREIGN OBJECT DETECTING APPARATUS IN MULTIPLE CHARGING CONDITION USING PLURALITY OF TRANSMITTING COILS

(71) Applicant: LG ELECTRONICS INC., Seoul (KR)

(72) Inventors: Hyengcheul Choi, Seoul (KR); Seong Hun Lee, Seoul (KR); Beom Seok Chae, Seoul (KR); Sooyong Park, Seoul (KR); Hwanyong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/742,236

(22) Filed: Jan. 14, 2020

(65) Prior Publication Data
US 2020/0266671 A1    Aug. 20, 2020

(30) Foreign Application Priority Data
Feb. 15, 2019   (KR) .................. 10-2019-0018163

(51) Int. Cl.
*H02J 50/60*       (2016.01)
*H02J 50/12*       (2016.01)
(Continued)

(52) U.S. Cl.
CPC .............. *H02J 50/60* (2016.02); *H02J 50/12* (2016.02); *H02J 50/402* (2020.01);
(Continued)

(58) Field of Classification Search
CPC .. H02J 50/60; H02J 50/80; H02J 50/12; H02J 50/402; H02J 50/502; H02J 7/0029; H02J 50/70
(Continued)

(56) References Cited

U.S. PATENT DOCUMENTS

2010/0328044 A1*  12/2010  Waffenschmidt ....... H02J 7/025
                                                       340/10.4
2014/0087453 A1*   3/2014  Tahara ............... G01N 15/1434
                                                       435/288.7
(Continued)

FOREIGN PATENT DOCUMENTS

EP          2 824 798 A1    1/2015
EP          2 950 415 A1   12/2015
WO     WO 2018/123767 A1    7/2018

*Primary Examiner* — Metasebia T Retebo
(74) *Attorney, Agent, or Firm* — Birch, Stewart, Kolasch & Birch, LLP

(57) ABSTRACT

An apparatus is provided in which electromagnetic field components generated by a transmitting coil is induced to other transmitting coils based on plurality of transmitting coils being driven for multiple wireless charging, for example, wirelessly charging two or more receivers to prevent degradation in performance of detecting a receiving coil and a foreign object during multiple wireless charging. According to the present disclosure, the receiving coil and foreign object detecting apparatus in multiple charging conditions using the plurality of transmitting coils includes an induced signal processor. The induced signal processor can control an amount of voltage and an operation frequency corresponding to the wireless charging coil and can detect a peak and can include a filter to thereby prevent interference of a signal induced from other neighboring transmitting coils.

18 Claims, 14 Drawing Sheets

(51) Int. Cl.
*H02J 50/40* (2016.01)
*H02J 50/50* (2016.01)
*H02J 50/80* (2016.01)
*H02J 7/00* (2006.01)

(52) U.S. Cl.
CPC ............ *H02J 50/502* (2020.01); *H02J 50/80* (2016.02); *H02J 7/0029* (2013.01)

(58) Field of Classification Search
USPC ........................................................ 307/104
See application file for complete search history.

(56) References Cited

U.S. PATENT DOCUMENTS

| | | |
|---|---|---|
| 2014/0339906 A1 | 11/2014 | Miyamoto et al. |
| 2015/0042171 A1* | 2/2015 | Kohara .................. H02J 5/005 307/104 |
| 2015/0349541 A1 | 12/2015 | Yamamoto et al. |
| 2019/0148983 A1* | 5/2019 | Kozakai .................... H02J 7/00 320/108 |
| 2019/0386492 A1 | 12/2019 | Fukuzawa et al. |

* cited by examiner

– PRIOR ART –

RECEIVING COIL AND FOREIGN OBJECT DETECTING APPARATUS IN MULTIPLE CHARGING CONDITION USING PLURALITY OF TRANSMITTING COILS

CROSS-REFERENCE TO RELATED APPLICATION

The present disclosure claims priority to and the benefit of Korean Patent Application No. 10-2019-0018163, filed on Feb. 15, 2019 in the Republic of Korea, the disclosure of which is incorporated herein by reference in its entirety.

BACKGROUND

1. Field of the Invention

The present disclosure relates to an apparatus in which, based on a plurality of transmitting coils being driven for multiple wireless charging, for example, wirelessly charging two or more receivers, electromagnetic field components generated by a transmitting coil are induced to another transmitting coil, to prevent degradation in performance of detecting a receiving coil and foreign objects during the operation of multiple charging.

2. Description of Related Art

Based on a conductor other than a wireless power receiver, for example, a foreign object FO being present in a wirelessly chargeable region, an electromagnetic signal transmitted by a wireless power transmitter can be induced to the foreign object FO to increase a temperature of the foreign object FO. For example, the foreign materials FOs can include coins, clips, pins, ballpoint pens, and the like.

Based on the foreign object FO being present between a wireless power receiver and a wireless power transmitter, a wireless charging efficiency thereof can be significantly degraded and temperatures of the wireless power receiver and the wireless power transmitter can increase due to an increase in an ambient temperature of the foreign object FO. Based on the foreign object FO disposed in the charging area being not removed, power waste can occur and the wireless power transmitter and the wireless power receiver can be damaged due to overheating.

U.S. Patent Application Publication No. 2015-0130407 (published on May 14, 2015), which is a related art document, discloses a system that uses a three-coil topology for wireless power transmission.

FIG. 1 shows a system using a three-coil topology for wireless power transfer in related art.

Referring to FIG. 1, the system can include a transmitter 20 and a receiver 30. The transmitter 20 can include a primary resonator 11 and a repeater resonator 12, and the receiver 30 can include a receiver resonator 13.

In this case, the primary resonator 11 can include a power 14, a primary coil 21, and a first resonance capacitor 22. The repeater resonator 12 can be in proximity to the primary resonator 11 and can include an intermediate coil 23 and a second resonance capacitor 24. The receiver resonator 13 can include a receiver coil 31 and a third resonance capacitor 32. The receiver resonator 13 can include the receiver coil 31 and the third resonance capacitor 32 connected to each other electrically in parallel.

The power transmitted by the transmitter 20 can be wirelessly received at the receiver 30. The receiver coil 31 can receive a magnetic field from the transmitter 20 and can generate a current flowing through the receiver coil to inductively supply to a load 15.

Based on the current flowing through the receiver coil generated by the receiver 30, when the foreign material FO is disposed at an upper end of the receiver 30, the receiver coil 31 can generate an inductance. The foreign object FO can be detected based on an amount of changed inductance detected at both ends of the receiver coil 31.

The wireless charging system in the related art can be a 1:1 wireless charging system and may not significantly satisfy user convenience. According to Qi which is a wireless charging standard (supervised by wireless power consortium (WPC), a shared mode standard is being established to support N:N multiple wireless charging advanced from the 1:1 wireless charging in the related art. That is, a multiple wireless charging system capable of simultaneously and wirelessly charging multiple receivers is being studied.

The wireless charging region of the wireless charger can be mainly formed inside the transmitting coil and can also be formed in an external area of the transmitting coil. The physical phenomenon can affect sensitivity in detection of the foreign objects and the receiver of the wireless charger system. Accordingly, in contrast to the 1:1 wireless charging, N:N multiple wireless charging causes a problem in stabilization of a detection signal.

In some examples, the N:N multiple wireless charger can output a voltage induced to the coil during wireless charging and has a low value of a signal used for detecting the transmitter and the foreign objects. That is, the N:N multiple wireless charger may not detect the foreign objects based on interference of signals generated by other wireless charging terminals. Thus, the detection signal may not be stabilized in conditions in which the signal is induced between signals with a low level.

SUMMARY OF THE INVENTION

The present disclosure provides an apparatus including electromagnetic field components generated by a transmitting coil induced to other transmitting coils, based on a plurality of transmitting coils being driven for multiple wireless charging, for example, wirelessly charging two or more receivers to thereby prevent degradation in performances of detecting the receiving coil and the foreign object during the multiple charging operation.

The present disclosure can also provide an apparatus that concentrates a magnetic field generated by a transmitting coil into a resonance coil having a region similar to a charging region to increase an amount of voltage (or current) of the transmitting coil that is changed by the receiver and based on foreign objects to perform precise determination to determine the receiver and the foreign object.

The present disclosure further provides an apparatus that separates a frequency used for detecting a foreign object from a frequency used for charging and detects that the foreign matter is not detectable due to interference of a signal generated by other wireless charging terminals in conditions of simultaneous multiple charging to thereby shorten a detection time based on a short period of the signal used for the detection.

The present disclosure can further provide an apparatus capable of stabilizing an unstable detection signal even in a condition in which the signal is induced between the coils with a low level because the coil outputs very high voltage induced to the coil during wireless charging and the signal used for detecting the transmitter and the foreign object has a low value.

The present disclosure further provides an apparatus that adjusts impedance difference between coils using a loop coil to thereby reduce impedance difference between the transmitting coils and has a coupling structure between the receiving coil and the transmitting coil to thereby reduce impedance deviation between the receiving coils.

The objects of the present disclosure are not limited to the above-mentioned objects, and other objects and advantages of the present disclosure which are not mentioned can be understood by the following description and more clearly understood by the embodiments of the present disclosure. It will also be readily apparent that the objects and advantages of the present disclosure can be realized by features described in claims and a combination thereof.

According to the present disclosure, the receiving coil and the foreign object detecting apparatus under the multiple charging conditions using the plurality of transmitting coils can transmit a foreign object detection signal and a wireless power signal having different resonance values from each other during charging by the charger and can detect at least one of the foreign object and the wireless power receiving apparatus based on an output voltage with respect to the foreign object detection signal.

In some examples, according to the present disclosure, the receiving coil and foreign object detecting apparatus under the multiple charging conditions using the plurality of transmitting coils can include a resonance variable portion that varies a resonance value of the charger, to thereby detect the foreign object during charging of the wireless charging receiving apparatus.

In some examples, according to the present disclosure, the receiving coil and foreign object detecting apparatus under multiple charging conditions using the plurality of transmitting coils can further include a resonance loop between the transmitting coil and a charging pad to thereby increase sensitivity of an output voltage Vout.

In some examples, according to the present disclosure, the receiving coil and foreign object detecting apparatus under the multiple charging conditions using the plurality of transmitting coils can include an induced signal processor that can control an amount of voltage and a driving frequency corresponding to the wireless charging coil and can detect a peak thereof and can include a filter to thereby prevent interference of signal induced from the neighboring other transmitting coils.

In some examples, in the present disclosure, the receiving coil and foreign object detecting apparatus under the multiple charging conditions using the plurality of transmitting coils can include an induced signal processor F. The induced signal processor F can include a peak detecting circuit in which a diode FD and a capacitor FC2 are connected to each other electrically in parallel. The detection signal can be stabilized based on a detection voltage observation time longer than a detection signal period to have a representative value of the frequency of the signal as a maximum value of the frequency of the signal.

In some examples, according to the present disclosure, the receiver and foreign object detecting apparatus under the multiple charging conditions using the plurality of transmitting coils can include the induced signal processor F. The induced signal processor F can include a high pass filter including the capacitor FC1 and a resistance FR connected to each other electrically in parallel to block the wireless charging signal and pass the detection signal, thereby removing induced noise.

According to the present disclosure, the receiving coil and foreign object detecting apparatus under the multiple charging conditions using the plurality of transmitting coils can detect at least one of the foreign object and the wireless power receiving apparatus disposed on the charging pad based on a foreign object detection signal transmitted by the charger.

In some examples, according to the present disclosure, the receiving coil and foreign object detecting apparatus under the multiple charging conditions using the plurality of transmitting coils can vary the resonance value of the charger and can transmit at least one of the wireless power signal and the foreign object detection signal and may not require an additional coil that detects the foreign object to thereby reduce production costs and simplify a production process thereof.

In some examples, according to the present disclosure, the receiving coil and foreign object detecting apparatus under the multiple charging conditions using the plurality of transmitting coils can transmit the foreign object detection signal to detect whether the foreign objects are disposed on the charging pad with set time intervals during transmission of the wireless power signal to the wireless power receiving apparatus disposed on the charging pad and can detect the foreign objects in real time to thereby prevent excessive heat generation and improve reliability.

In some examples, according to the present disclosure, the receiving coil and foreign object detecting apparatus under the multiple charging conditions using the plurality of transmitting coils can include electromagnetic field components generated by the transmitting coil induced to another transmitting coil based on the plurality of transmitting coils are driven for multiple wireless charging, for example, wirelessly charging two or more receivers to thereby prevent degradation in performance of detecting the receiving coil and the foreign object during multiple charging.

In some examples, according to the present disclosure, the receiving coil and foreign object detecting apparatus under the multiple charging conditions using the plurality of transmitting coils can concentrate the magnetic field generated by the transmitting coil into the resonance coil having a similar region to the charging region and can increase an amount of voltage (or current) of the transmitting coil changed by a receiver and based on the foreign objects to thereby perform the precise determination to determine the receiver and the foreign matter.

In some examples, according to the present disclosure, the receiving coil and foreign object detecting apparatus under the multiple charging conditions using the plurality of transmitting coils can separate a frequency used for detecting the foreign objects from a frequency used for charging to detect that the foreign matter is undetectable due to the interference of a signal generated by other wireless charging terminals in conditions of simultaneous multiple charging to thereby shorten the detection time based on a less period of the signal used for detection.

In some examples, according to the present disclosure, the receiver and foreign object detecting apparatus under the multiple charging conditions using the plurality of transmitting coils can stabilize the unstable detection signal even in conditions in which the signals are induced between coils with a low level because the very high voltage is induced to the coil during wireless charging and the signal having a less value is used for detecting the transmitter and the foreign objects.

In some examples, according to the present disclosure, the receiving coil and foreign object detecting apparatus under the multiple charging conditions using the plurality of transmitting coils can adjust the impedance difference between coils using the loop coil to thereby reduce the impedance difference between the transmitting coils and can have a coupling structure between the receiving coil and the transmitting coil to thereby reduce the impedance deviation between receiving coils.

In some examples, according to the present disclosure, the wireless charging devices such as wearable devices and accessories, in addition to mobile phones, are greatly used as a receiving coil and foreign object detecting apparatus under the multiple charging conditions using the plurality of transmitting coils so that the multiple charging can be advantageous to users in an aspect of user experience (UX).

Various effects and advantages of the present disclosure, in addition to the above-mentioned effects, will be described together while describing a specific matter for implementing the present disclosure.

DETAILED DESCRIPTION OF THE EMBODIMENTS

Figure 1:
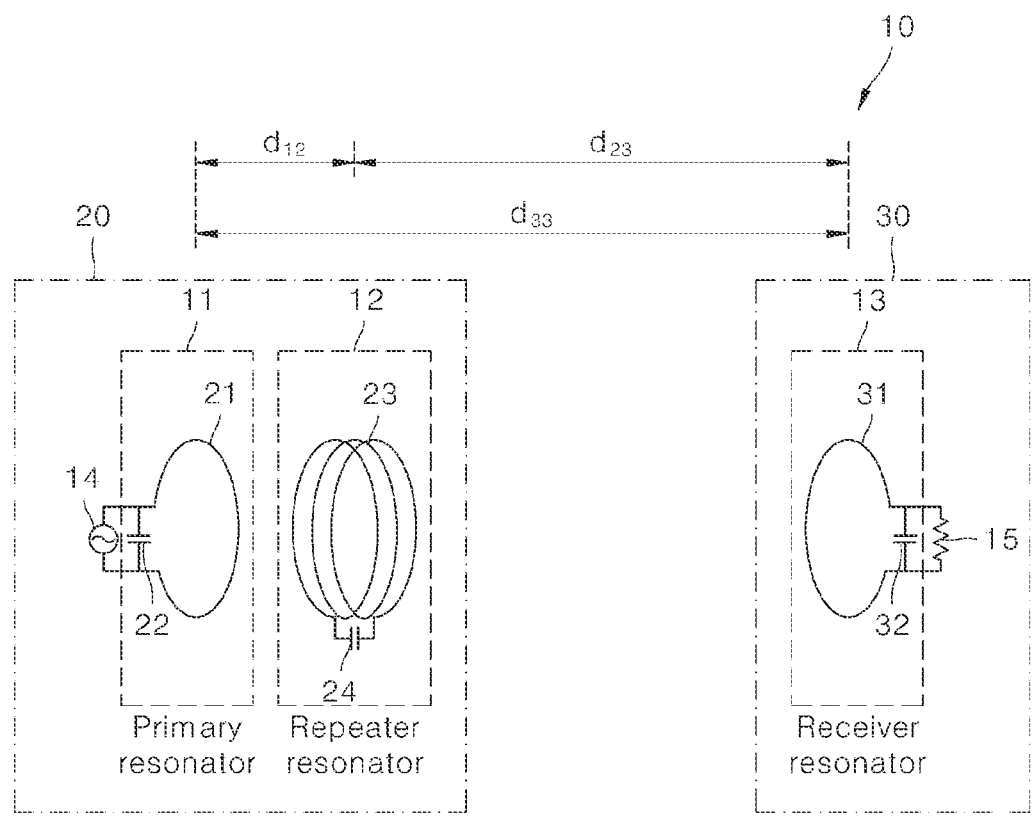
FIG. 1 shows a system using a three-coil topology for wireless power transmission in a related art.

The above mentioned objects, features, and advantages of the present disclosure will be described in detail with reference to the accompanying drawings, so that those skilled in the art to which the present disclosure pertains can easily implement the technical idea of the present disclosure. In the description of the present disclosure, when it is determined that the detailed description of the known technology related to the present disclosure can obscure the gist of the present disclosure, the detailed description thereof will be omitted. Hereinafter, one or more embodiments of the present disclosure will be described in detail with reference to the accompanying drawings. Same reference numerals in the drawings are used to indicate same or similar components.

Hereinafter, when any component is arranged at "an upper portion (or a lower portion)" of the component or "on (or under") of the component, any component can be arranged in contact with an upper surface (or a lower surface) of the component, and another component can be interposed between the component and any component arranged on (or under) the component. Further, when one component is described as being "connected", "coupled", or "connected" to another component, the components can be directly connected or able to be connected to the other component; however, it is also to be understood that an additional component can be "interposed" between the two components, or the two components can be "connected", "coupled" or "connected" through an additional component.

Unless otherwise stated, each component can be singular or plural throughout the disclosure.

As used herein, the singular forms "a," "an" and "the" are intended to include the plural forms as well, unless the context clearly indicates otherwise. In the present disclosure, it should not be construed that terms such as "including" or "comprising" necessarily include various types of components or various steps described in the present disclosure, and it should be construed terms such as "including" or "comprising" do not include some components or some steps or can include additional components or steps.

A receiving coil and foreign object detecting apparatus under multiple charging conditions using a plurality of transmitting coils according to some embodiments of the present disclosure is described below.

Figure 2:
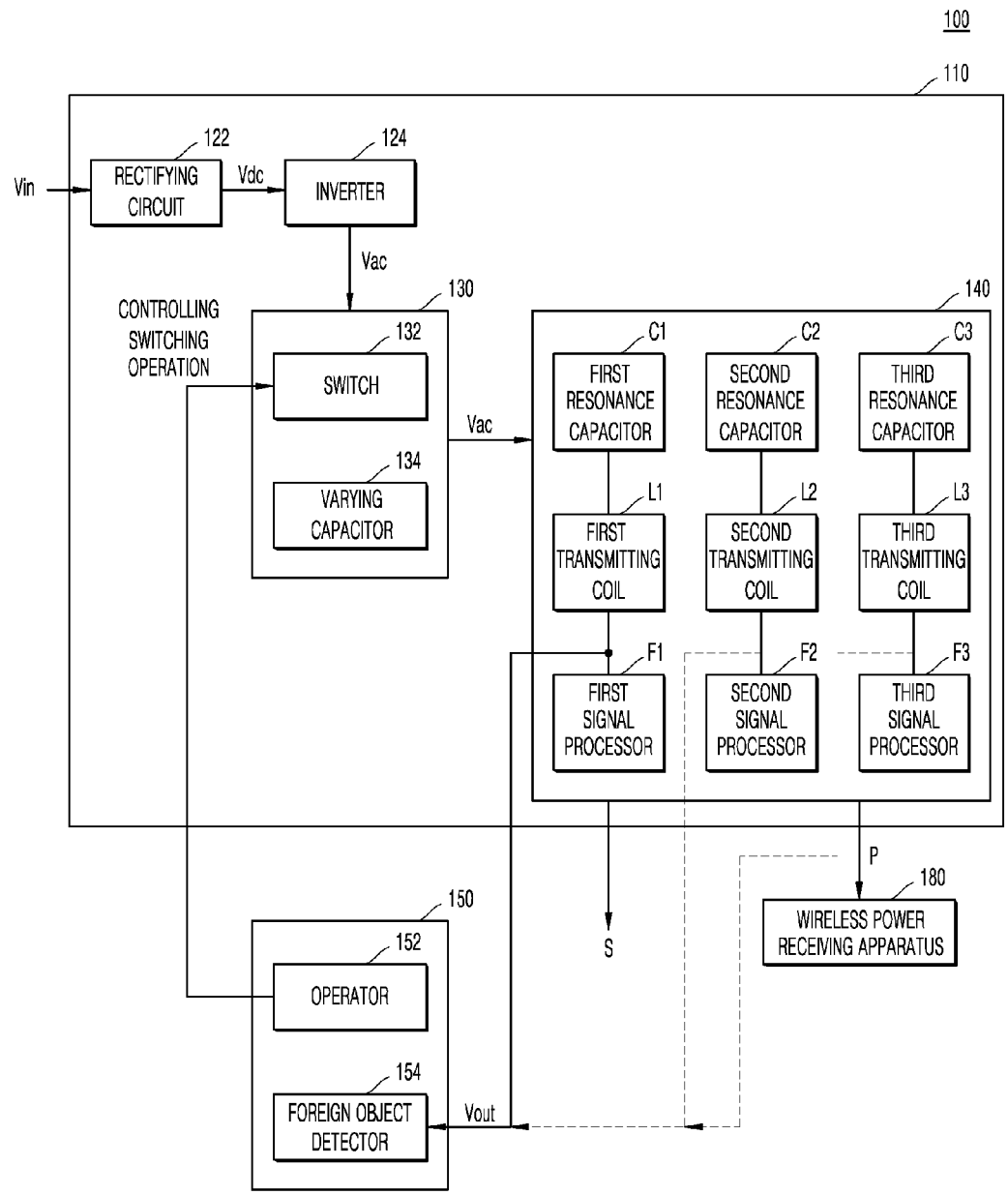
FIG. 2 is a block diagram showing an example configuration of a receiving coil and foreign object detecting apparatus under multiple charging conditions using a plurality of transmitting coils according to an embodiment of the present disclosure.

The receiving coil and foreign object detecting apparatus under the multiple charging conditions using the plurality of transmitting coils shown in FIG. 2 is according to an embodiment, and components of the receiving coil and foreign object detecting apparatus are not limited to examples shown in FIG. 2, and some components of the receiving coil and foreign object detecting apparatus can be added, changed or deleted as necessary.

FIG. 2 is a block diagram showing an example configuration of a receiving coil and foreign object detecting apparatus in multiple charging conditions using a plurality of transmitting coils according to an embodiment of the present disclosure. All components of the receiving coil and foreign object detecting apparatus according to all embodiments of the present disclosure are operatively coupled and configured.

Referring to FIG. 2, the receiving coil and foreign object detecting apparatus 100 of the present disclosure can include a charger 110 and a controller 150.

The charger 110 can include a rectifying circuit 122, an inverter 124, a resonance variable portion 130, and a transmitter 140.

The rectifying circuit 122 can rectify, into a direct current (DC) power Vdc, an alternating current (AC) input power Vin input from an external power source. In this case, the rectifying circuit 122 can include at least one diode. For example, the rectifying circuit 122 can include any one of a half-wave rectifying circuit, a full-wave rectifying circuit, a bridge full-wave rectifying circuit, and a power factor correction (PFC) circuit.

In an embodiment, the rectifying circuit 122 may not be used based on the DC input power Vin being input.

The inverter 124 can convert the DC power Vdc into an AC type driving power Vac. That is, the inverter 124 can include at least one switching element. In some examples, the at least one switching element can repeatedly perform the turn-on and turn-off operations based on a predetermined driving frequency. For example, at least one switching element can include an insulated gate bipolar mode transistor (IGBT) or a field-effect-transistor (FET).

The resonance variable portion 130 can be disposed between the inverter 124 and the transmitter 140.

The resonance variable portion 130 can include a switch 132 and a variable capacitor 134.

The switch 132 can perform switching-on operation and switching-off operation under the control of the controller 150. Based on performing the switching-on operation, the switch 132 can transmit, to the transmitter 140, a driving power Vac output by the inverter 124.

In some examples, based on the switch 132 performing the switching-off operation, the variable capacitor 134 can vary the frequency of the driving power Vac output by the inverter 124. That is, the variable capacitor 134 can vary the resonance value of the transmitter 140.

The variable capacitor 134 and the switch 132 can be connected to each other electrically in parallel. Therefore, the transmitter 140 can transmit, based on the switching operation of the switch 132, a foreign object detection signal having a second resonance value changed from the first resonance value of the transmitted wireless power signal P.

Based on the switch 132 performing the switching-on operation and the driving power Vac output by the inverter 124 being input, the transmitter 140 transmits a wireless power signal P to the wireless power receiving apparatus 180 disposed on the charging pad.

In order to transmit the wireless power signal P, the transmitter 140 can include at least one transmitting coils L1, L2, and L3, one or more resonance capacitors C1, C2, and C3, and one or more induced signal processors F1, F2, and F3.

In this case, each of the transmitting coils L1, L2, and L3 and each of the resonance capacitors C1, C2, and C3 can include any one of a series resonance circuit, a parallel resonance circuit, and a series-parallel resonance circuit.

Each of the transmitting coils L1, L2, and L3 can transmit the wireless power signal P having the first resonance value based on the driving power Vac and the capacitance of each of the resonance capacitors C1, C2, and C3.

Each of the induced signal processors F1, F2, and F3 can be inserted between the wireless power receiving apparatus 180 and the transmitting coils L1, L2, and L3 to prevent a signal induced from other neighboring transmitting coils. That is, each of the induced signal processors F1, F2, and F3 can prevent interference of signals generated by transmitting coils included in other neighboring wireless charging terminals during wireless charging performed by an N: N multiple wireless charger.

For example, each of the induced signal processors F1, F2, and F3 can include a peak detection circuit in which a diode and a capacitor are connected to each other electrically in parallel in order to reduce signal influence induced from other transmitting coils. That is, as the other transmitting coils have a predetermined maximum amount of induced voltage, the detection signal can be stabilized by adding the peak detection circuit and based on a detection voltage observation time longer than the detection signal period to have a maximum value of the frequency of the signal as a representative value of the frequency of the signal.

For another example, each of the induced signal processors F1, F2, and F3 can include a high pass filter in which a capacitor and a resistor are connected to each other electrically in parallel to block a main signal of another transmitting coil. That is, as the wireless charging signal generated by the other transmitting coils has a fundamental frequency lower than the detection signal, the wireless charging signal is blocked and the detection signal passes to remove a considerable amount of induced noise.

In FIG. 2, the transmitter 140 includes three transmitting coils L1, L2 and L3, three capacitors C1, C2 and C3, and three induced signal processors F1, F2, and F3. Numbers of the transmitting coils, capacitors, and the induced signal processors may not be limited.

In some examples, based on the switch 132 performing the switching-off operation to be electrically connected to the variable capacitor 134, the transmitter 140 can transmit the foreign object detection signal S having the second resonance value varied from the first resonance value.

That is, as the variable capacitor 134, the resonance capacitors C1, C2, and C3 and the transmitting coils L1, L2, and L3 have the second resonance value, the transmitter 140 can transmit the foreign object detection signal S having a frequency changed from the frequency of the driving power Vac.

In this case, the variable capacitor 134 can have a capacitance value less than a capacitance value each of the resonance capacitors C1, C2, and C3.

In some examples, the variable capacitor 134 can compensate for an imaginary part of the impedance to precisely determine an amount of changed impedance of the transmitting coils L1, L2, and L3. That is, the variable capacitor 134 is needed to cancel the imaginary part of the input impedance of the transmitting coils L1, L2, and L3, and the switch 132 is used during charging of the wireless power receiving apparatus 180 without using the variable capacitor 134.

The controller 150 can include an operator 152 and a foreign object detector 154.

The operator 152 can control the switching-on and switching-off operation of the switch 132. That is, the operator 152 can switch on the switch 132 so that the wireless power signal P is transmitted to the wireless power receiving apparatus 180. In some examples, the operator 152 can switch off the switch 132 so that the foreign object detection signal S is transmitted to detect the foreign objects.

The foreign object detector 154 can detect, based on the foreign object detection signal S being transmitted, an output voltage Vout corresponding to the foreign object detection signal S between the transmitting coils L1, L2, and L3 and the induced signal processors F1, F2, and F3. The induced signal processors F1, F2, and F3 can prevent a signal induced from other neighboring coils.

The foreign object detector 154 can detect whether at least one of the foreign object and the wireless power receiving apparatus 180 is disposed on the charging pad based on the output voltage Vout.

For example, the operator 152 can switch off, based on the wireless power receiving apparatus 180 not disposed on the charging pad, the switch 132 to determine whether at least one of the wireless power receiving device 180 and the foreign object is disposed on the charging pad.

At this time, as the transmitter 140 transmits the foreign object detection signal S, the foreign object detector 154 determines, based on the output voltage Vout, whether at least one of the wireless power receiving apparatus 180 and the foreign object is disposed on the charging pad.

That is, the foreign object detector 154 can set, based on the wireless power receiving apparatus 180 and the foreign objects being not disposed on the charging pad, a reference voltage corresponding to the foreign object detection signal S. In this case, a setter can be added to measure a set reference voltage to thereby determine that the wireless power transmitting apparatus is in a ready state at present.

Subsequently, the foreign object detector 154 detects, based on at least one of the wireless power receiving apparatus 180 and the foreign objects disposed on the charging pad, an amount of changed impedance, which is variable. In some examples, the foreign object detector 154 can determine, based on an amount of changed impedance, which is variable, whether the output voltage Vout belongs to any one of the first reference set range to the third reference set range set based on the reference voltage. In this case, the output voltages Vouts can be set to be in the set ranges based on the foreign objects present on the charging pad, the wireless power receiving apparatus 180 present on the charging pad, and the foreign object and the wireless power receiving apparatus 180 present on the charging pad.

The first reference set range can have a range of 0.55 times to 0.7 times the reference voltage corresponding to the foreign object detection signal S.

In some examples, the second reference set range can have a range of 0.71 times to 0.9 times the reference voltage corresponding to the foreign object detection signal S.

The third reference set range can have a range of 0.91 to 1.2 times the reference voltage corresponding to the foreign object detection signal S.

Accordingly, the foreign object detector 154 detects that, based on the output voltage Vout belonging to a first reference set range, the wireless power receiving apparatus 180 is disposed on the charging pad. In some examples, the foreign object detector 154 detects that, based on the output voltage Vout belonging to a second reference set range, the foreign object and the wireless charging receiving apparatus 180 are disposed on the charging pad. The foreign object detector 154 detects that, based on the output voltage Vout belonging to the third reference set range, the foreign object is disposed on the charging pad.

In some examples, the operator 152 can control, based on the foreign object detector 154 detecting that the wireless power receiving apparatus 180 is disposed on the charging pad, the charger 110 to transmit the wireless power signal P.

In some examples, based on the foreign object detector 154 detecting that the foreign object and the wireless power receiving apparatus 180 or the foreign object being disposed, the foreign object detector 154 can emit LED light to outside. In some examples, the foreign object detector 154 can block the driving power Vac so that the wireless power signal P is not transmitted by the charger 110.

The controller 150 according to the embodiment is described in detail below with reference to FIGS. 4A and 4B.

FIGS. 3A to 3D are structural diagrams showing the structure of the transmitter in FIG. 2.

Figure 3A:
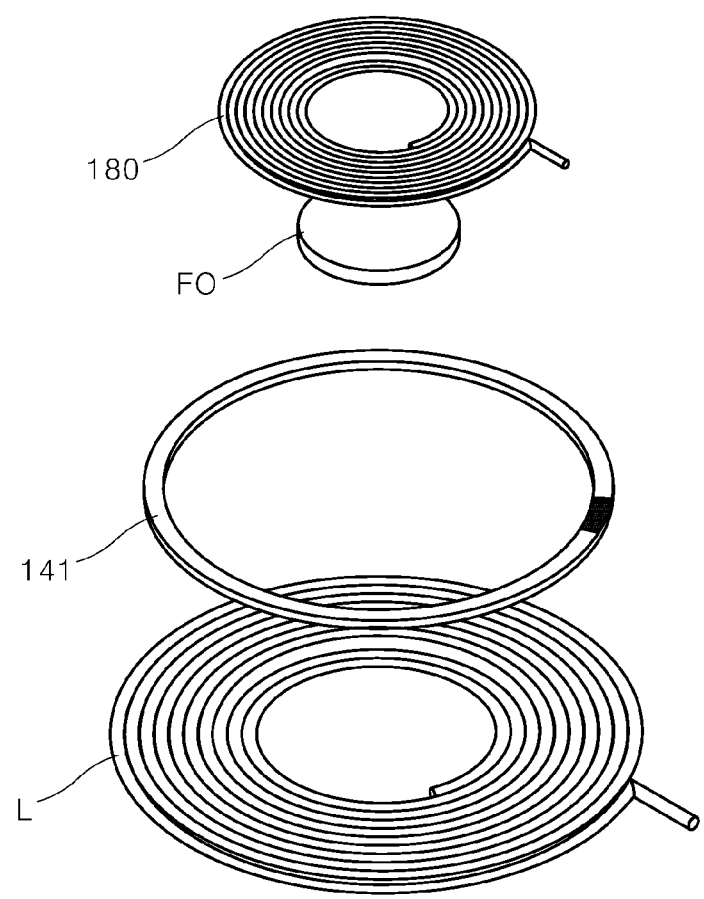
FIGS. 3A to 3D are structural diagrams showing a structure of a transmitter in FIG. 2.
Figure 3B:
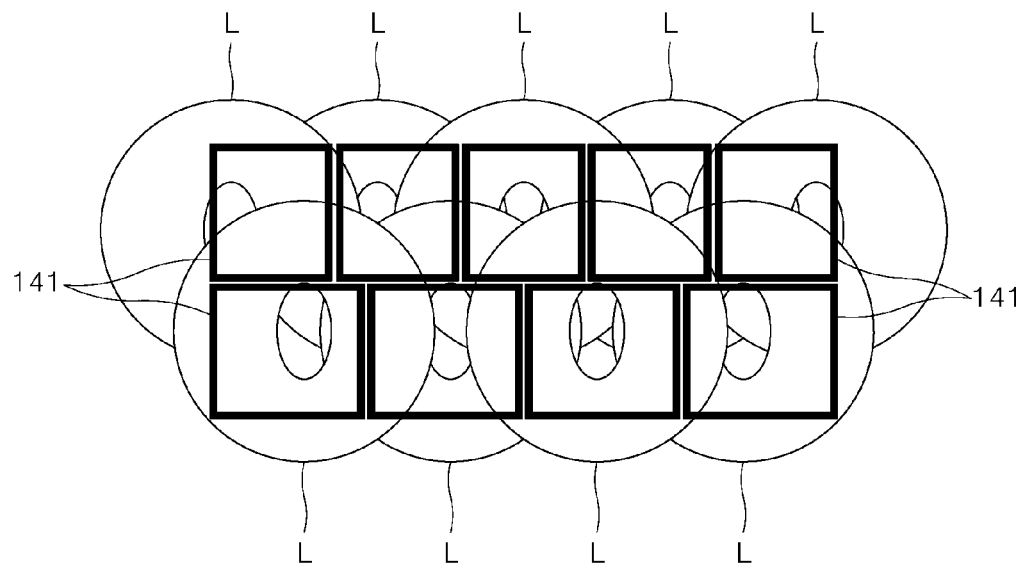
Figure 3C:
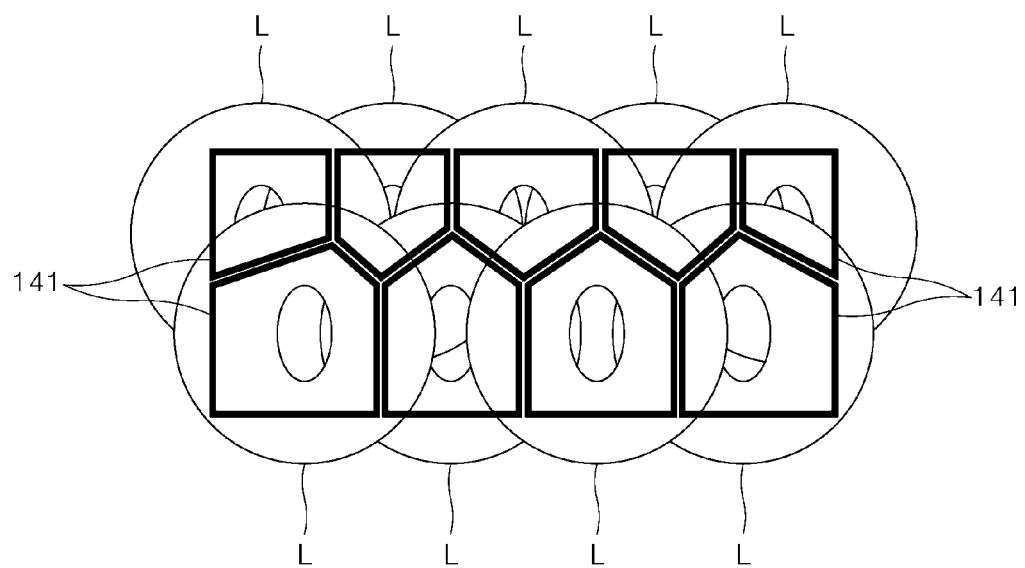
Figure 3D:
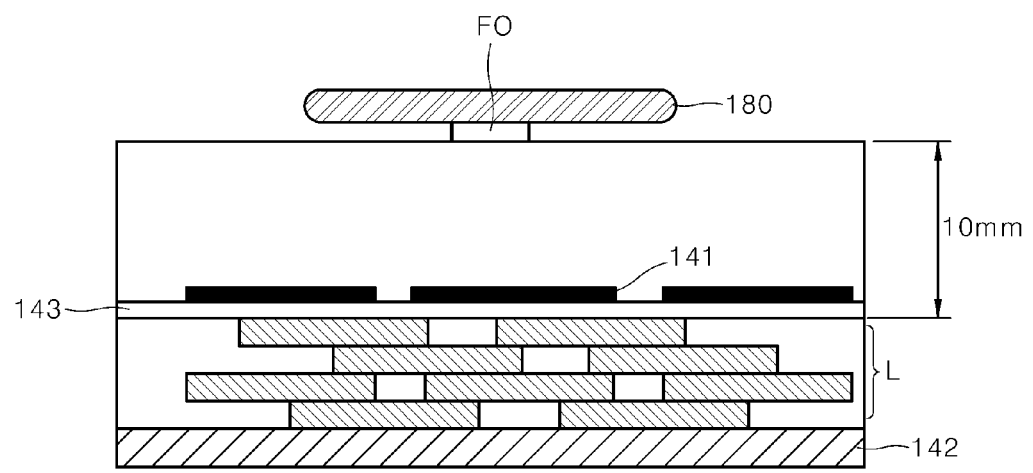

FIG. 3A is a structural diagram showing one transmitting coil and resonance capacitor of a transmitter. FIGS. 3B to 3D are structural diagrams showing two or more transmitting coils and resonance capacitors of transmitters.

As shown in FIG. 3A, a transmitter 140 includes a resonance loop 141 between the transmitting coil L and a foreign object FO and a wireless power receiving apparatus (receiving coil) 180. In this case, the resonance loop 141 can include the resonance coil, but is not limited thereto, and the resonance loop 141 can include a wire.

The transmitter 140 can further include the resonance loop 141 between the transmitting coil L and the wireless power receiving apparatus (the receiving coil) 180 to increase sensitivity of the output voltage Vout. That is, based on the resonance loop 141 being not present in the transmitter 140, a measured actual impedance value is very low. In some examples, an amount of changed actual impedance value measured by the transmitting coil L is also very low. The foreign object detector 154 can be difficult to detect the amount of changed impedance, which is variable, to detect the wireless power receiving apparatus 180 and the foreign object disposed on the charging pad. That is, the foreign material detector 154 can classify the voltage value of the output voltage Vout into the first reference set range and the third reference set range based on the amount of changed impedance, which is variable. That is, it is difficult to classify the voltage values of the output voltage to have the reference set ranges because the less amount of changed impedance is provided.

In some examples, the resonance loop 141 can include a resonance coil having a loop structure to concentrate a detection signal generated by the transmitting coil, and a capacitor that resonates at a corresponding frequency. The resonance loop may not include a repeater coil, but can include a resonance coil.

The repeater coil improves a recognition distance and the resonance coil can use a high frequency (about 5 times) to dispose, on the resonance loop 141, the foreign material FO and the wireless power receiving apparatus 180 disposed on the charging pad. This allows compensation for distance. The resonance loop 141 has a low values of inductance and capacitance and has a simple structure. In some examples, the resonance loop 141 can use a high frequency band without affecting the charging of the wireless power receiving apparatus 180 when the foreign material FO is detected.

In some examples, one of the transmitting coils Ls can correspond to each of the resonance loops 141.

In FIG. 3A, the transmitting coil L and the resonance loop 141 have a ring shape, but are not limited thereto, and can have an elliptic shape and a polygonal shape.

As shown in FIGS. 3B to 3D, at least two transmitting coils Ls and resonance loops 141 can be provided.

In this case, at least two transmitting coils Ls can be disposed on the same plane and at least two transmitting coils Ls can be stacked on at least two layers and the transmitting coils Ls stacked on at least two layers can be overlapped with one another. The transmitting coil L is spaced apart from the neighboring transmitting coil L disposed on the same layer. In some examples, a portion of areas of the stacked transmitting coils Ls can be overlapped with one another.

In some examples, at least two resonance loops 141 can be disposed on the same plane. Each of the resonance loops 141 can correspond to one of the transmitting coils Ls in an area of the transmitting coil L. In this case, the resonance loop 141 may not be overlapped with the neighboring resonance loop 141. However, the present disclosure is not limited thereto, and the resonance loop 141 can be overlapped with the neighboring resonance loop 141, which is not connected to the resonance loop 140 based on the arrangement of the transmitting coil L. The resonance loops 141 can be disposed on at least two layers and can be overlapped with one another.

In some examples, although the transmitting coil L and the resonance loop 141 have a ring shape, but the present disclosure is not limited thereto, and the transmitting coil L and the resonance loop 141 can have the elliptic shape and the polygonal shape.

Referring back to FIG. 3D, the transmitting coil L is disposed above a substrate 142. An insulating layer 143 is disposed between the transmitting coil L and the resonance loop 141. In this case, the substrate 142 can be made of ferrite.

In some examples, the transmitter 140 can form the charging pad having a thickness of 10 mm or less, preferably 7 mm or less above the resonance loop 141. The charging pad having a thickness of 10 mm or less can be provided to effectively detect an amount of changed impedance detected by the wireless power receiving apparatus 180 and the foreign object disposed on the charging pad.

The arrangement of the transmitting coils shown in FIGS. 3B to 3D is merely one embodiment, but is not limited thereto.

Figure 4A:
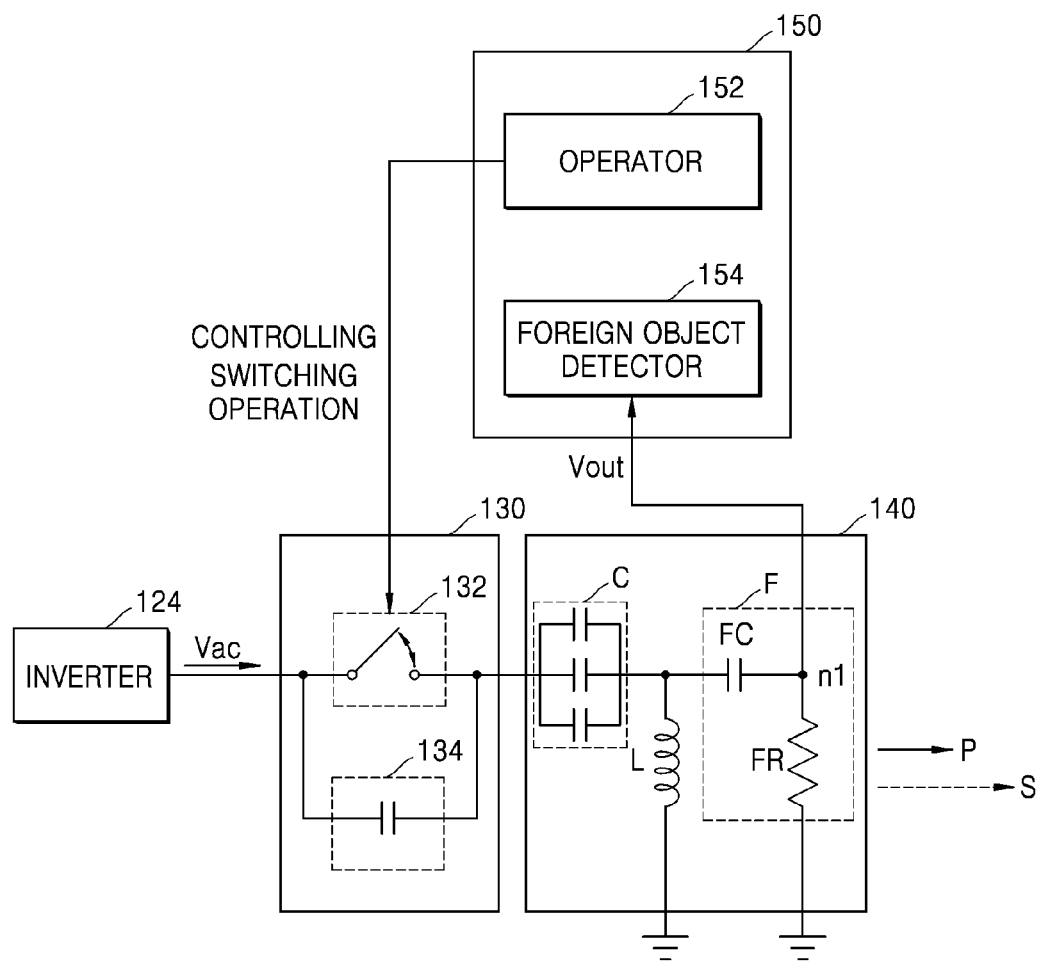
FIGS. 4A and 4B are circuit diagrams schematically showing a resonance variable portion, the transmitter, and a control portion in FIG. 2.

FIG. 4A is a circuit diagram schematically showing the resonance variable portion, the transmitter, and the controller in FIG. 2. FIG. 4B is a circuit diagram showing another example of an induced signal processor F of the transmitter 140 in FIG. 4A.

FIG. 4A shows a resonance variable portion 130 and a transmitter 140 included in a charger 110.

Referring to FIG. 4A, the resonance variable portion 130 can include a switch 132 and a variable capacitor 134. The switch 132 and the variable capacitor 134 can be connected to each other electrically in parallel.

A driving power Vac output by the inverter 124 is input to one side of the resonance variable portion 130.

The switch 132 can include an electronic switch, for example, the FET, the IGBT, a bipolar junction transistor (BJT), a relay, and the like, but is not limited thereto.

The switch 132 can perform switching-on operation or switching-off operation under the control of an operator 152.

Based on the switching-off operation of the switch 132, the variable capacitor 134 can vary a first resonance value to a second resonance value of the transmitter 140 and can vary the frequency of the driving power Vac so that the transmitter 140 transmits the foreign object detection signal S.

The variable capacitor 134 can vary the resonance value of the transmitting coil L from the first resonance value to the second resonance value based on a composite capacitance value with the resonance capacitor C included in the transmitter 140.

The transmitter 140 can include a transmitting coil L, a resonance capacitor C, and an induced signal processor F.

In an embodiment, the transmitting coil L represents at least one of the transmitting coils L shown in FIGS. 2 and 3A to 3D, and the resonance capacitor C represents the resonance capacitor C (the resonance capacitor S) shown in FIGS. 2 and 3A to 3D.

In some examples, the induced signal processor F can be inserted between the wireless power receiving apparatus 180 and the transmitting coil L to prevent a signal induced from other neighboring transmitting coils.

At this time, the induced signal processor F can include a high pass filter to connect the capacitor FC and the resistor FR electrically in parallel, as shown in FIG. 4A to block main signal of signals generated by the other transmitting coils. That is, as the wireless charging signal generated by the other transmitting coils has the fundamental frequency lower than the detection signal, the wireless charging signal can be blocked and the detection signal can pass to remove a considerable amount of induced noise.

The induced signal processor F removes the main component of the signal induced using the high pass filter because the wireless charging signal has a higher frequency than the detection signal. At this time, an operating frequency of the high pass filter can be set to be less than the detection signal frequency (to a certain degree).

Figure 4B:
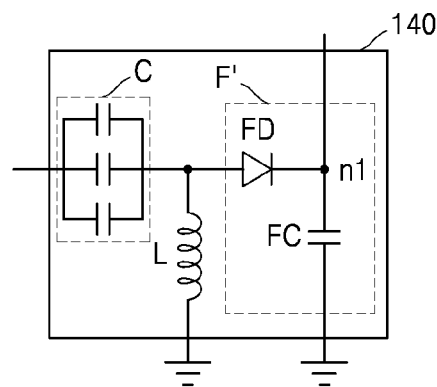

Alternatively, the induced signal processor F can include a peak detection circuit in which a diode FD and a capacitor FC are connected to each other electrically in parallel, as shown in FIG. 4B, in order to reduce the influence of a signal induced from other transmitting coils. That is, as the other transmitting coils provides a predetermined maximum induced amount with respect to voltages, the detection signal can be stabilized by adding the peak detection circuit and based on the detection voltage observation time longer than the detection signal period to have the maximum value of the frequency of the signal as the representative value of the frequency of the signal.

As inducing the wireless charging signal can be performed in principle, the induced signal processor F connects and uses the peak detection circuit to the node of the transmitting coil to stabilize the detection signal instead. The maximum value of the frequency of the detection signal is determined as the representative value of the frequency of the detection signal based on observation for longer period of than the detection signal period. In this case, the observation condition can be set differently based on a magnitude of the wireless charging signal.

Based on the switch 132 performing the switching-on operation, the transmitting coil L and the resonance capacitor C resonate based on the first resonance value so that the frequency of the driving power Vac varies. In some examples, a magnitude of the signal induced from other neighboring transmitting coils is reduced by the induced signal processor F based on the variable frequency of the driving power Vac so that the wireless power signal P can be transmitted.

In some examples, based on the switch 132 performing the switching-on operation, the transmitting coil L, the resonance capacitor C, and the variable capacitor 134 resonate based on the second resonance value, and thus, the frequency of the driving power Vac varies. In some examples, the magnitude of the signal induced from other neighboring transmitting coils is reduced by the induced signal processor F based on the variable frequency of the driving power Vac so that the foreign object detection signal S can be transmitted.

The foreign object detection signal S can have a higher frequency than the frequency of the wireless power signal P. That is, the foreign object detection signal S has a frequency greater than the frequency of the wireless power signal P based on a composite capacitance determined based on capacitance values of the variable capacitor 134 and the resonance capacitor C. In some examples, as the voltage induced to the coil during wireless charging is very high and the signal used for detecting the transmitter and the foreign object has a low value, it is difficult to detect the detection signal in a condition in which the signal is induced between coils with a low level. In this case, the induced signal processor F provides stabilization of the detection signal. That is, as the induced signal processor F can include the high pass filter or the peak detection circuit to control the amount of voltage and the driving frequency corresponding to the wireless charging coil, the induced signal processor F can stabilize the unstable detection signal.

The controller 150 can include an operator 152 and a foreign object detector 154.

The operator 152 can operate the switch 132 to switch-on and switch-off. That is, based on the wireless power receiving apparatus 180 being not disposed on the charging pad, the operator 152 switches off the switch 132 so that the foreign object detection signal S is transmitted to detect the wireless power receiving apparatus 180 and the foreign object disposed on the charging pad.

In some examples, based on the wireless power signal P being transmitted to charge the wireless power receiving apparatus 180 disposed on the charging pad, the operator 152 can change between the switching-on operation and the switching-off operation of the switch 132 at set time intervals. In this case, the induced signal processor F can repeatedly transmit the wireless power signal P and the foreign object detection signal S.

The induced signal processor F can use a signal having a different frequency in order to reduce mutual influence during simultaneous operation performed by the N: N multiple wireless charger (e.g., N is a number, preferably a positive integer). In some examples, the induced signal processor F can set the wireless charging signal to have a frequency lower than the frequency of the detection signal. For example, the detection signal can be set to have at least two times the frequency of the wireless charging signal. In some examples, the frequency of the detection signal can be set not to be the same as the high-order frequency of the wireless charging signal to reduce influence on the high-order component of the wireless charging signal.

The foreign object detector 154 can detect whether at least one of the wireless power receiving apparatus 180 and the foreign object is disposed on the charging pad based on the output voltage Vout detected at a node point n1 between the transmitting coil L and the induced signal processor F.

That is, the foreign object detector 154 can detect at least one of the wireless power receiving apparatus 180 and the foreign object depending on whether the output voltage Vout belongs to the set first reference set range and the third reference set range.

In this case, based on the foreign object present on the charging pad, the wireless power receiving apparatus 180 present on the charging pad, and the foreign object and the wireless power receiving apparatus 180 present on the charging pad, the output voltages Vouts can be set to be in set ranges.

The foreign material detector 154 detects that, based on the output voltage Vout belonging to the first reference set range, the wireless power receiving apparatus 180 is disposed on the charging pad.

The first reference set range can be in a range of 0.55 times to 0.7 times a reference voltage corresponding to the foreign object detection signal S. At this time, the output voltage Vout is reduced based on the mutual inductance between the receiving coil included in the wireless power receiving apparatus 180 and the transmitting coil L and has a range of 0.55 times to 0.7 times the reference voltage based on a standardized wireless power receiving apparatus 180 being disposed during wireless charging.

In some examples, the foreign material detector 154 detects that, based on the output voltage Vout belonging to the second reference set range, the wireless power receiving apparatus 180 and the foreign material are disposed on the charging pad.

The second reference set range can be a range of 0.71 to 0.9 times the reference voltage corresponding to the foreign object detection signal S. That is, the output voltage Vout has a range of 0.71 times to 0.9 times the first reference set range due to mutual inductance between the receiving coil included in the wireless power receiving apparatus 180 and the transmitting coil L and resistance of the foreign object.

The foreign object detector 154 detects that, based on the output voltage Vout belonging to the third reference set range, the foreign object is disposed on the charging pad.

The third reference set range can be a range of 0.91 times to 1.2 times the reference voltage corresponding to the foreign object detection signal S. That is, the output voltage Vout can increase 0.91 times to 1.2 times the reference voltage based on the resistance of the foreign object.

The output voltage has a set range in which a first reference set range determined based on the foreign object present on the charging pad is greater than a second reference set range determined based on the wireless power receiving apparatus present on the charging pad. In some examples, the output voltage has a setting range in which a third reference set range determined based on the foreign object and the wireless power receiving apparatus present on the charging pad is greater than the second reference set range determined based on the wireless power receiving apparatus present on the charging pad.

In some examples, the set range which is set based on comparison of the reference voltage can be changed based on a number of transmitting coils Ls of the transmitter 140 and overlapped positions of the transmitting coils Ls of the transmitter 140.

In some examples, based on the foreign object detector 154 detecting that the foreign object is disposed on the charging pad, the foreign object detector 154 can emit LED light to outside, and the present disclosure is not limited thereto.

Figure 5A:
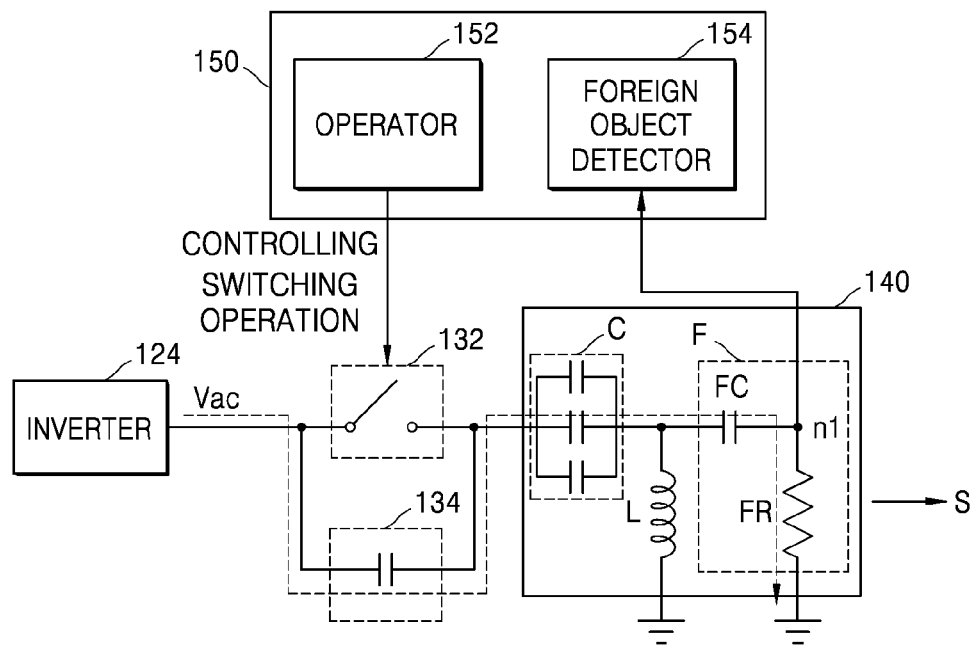
FIGS. 5A and 5B are operation circuit diagrams showing operation in a charging mode and a detecting mode in the circuit diagrams in FIGS. 4A and 4B.
Figure 5B:
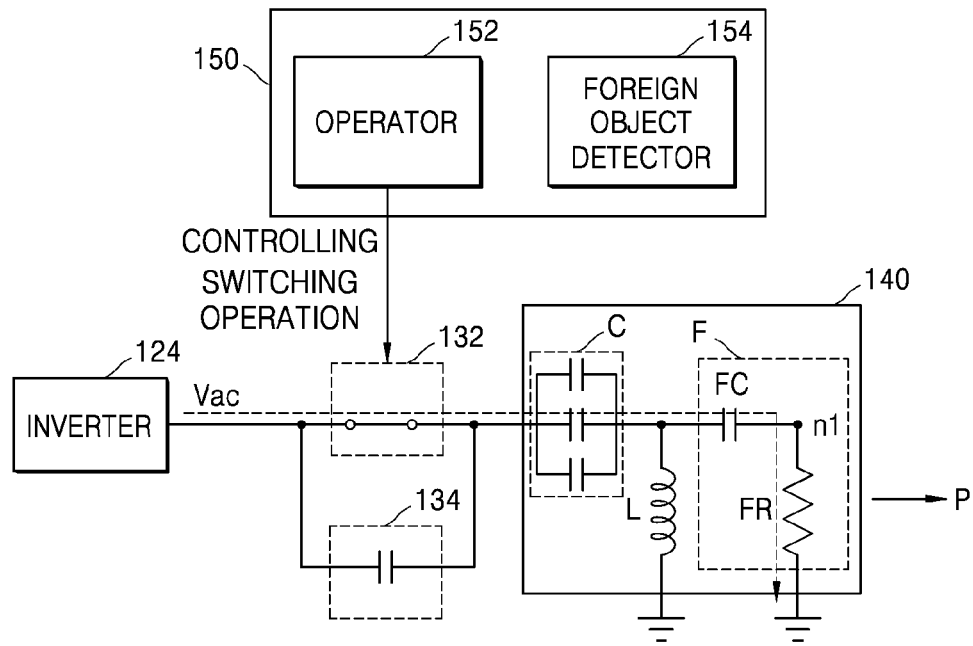

FIGS. 5A and 5B are operation circuit diagrams showing operation in a charging mode and a detecting mode in the circuit diagram of FIG. 4A. FIGS. 6A to 6E are voltage waveform diagrams showing an output voltage at a node point in FIGS. 4A and 4B and a first reference voltage range and a third reference voltage range.

FIG. 5A shows operation in a detecting mode. FIG. 5B shows operation in a charging mode.

Referring to FIGS. 5A and 5B, a controller 150 of a wireless charging transmitting apparatus 100 can operate in the charging mode and the detecting mode.

In FIG. 5A, the controller 150 can operate in the detecting mode to detect whether at least one of the wireless charging receiving apparatus 180 and a foreign material is placed on a charging pad.

That is, the operator 152 can switch off the switch 132 so that the driving power Vac output by the inverter 124 shown in FIG. 2 is input to a variable capacitor 134 included in a variable resonator 130.

In this case, the transmitter 140 changes the resonance value from the first resonance value to the second resonance value based on a composite capacitance of the resonance capacitor C and the variable capacitor 134 and the inductance of the transmitting coil L. In some examples, the magnitude of the signal induced from other neighboring transmitting coils is reduced by the induced signal processor F based on the variable frequency of the driving power Vac so that the foreign object detection signal S is transmitted.

The foreign object detector 154 detects the output voltage Vout of the induced signal processor F at the node point n1. Thereafter, the foreign object detector 154 determines whether the output voltage Vout belongs to any one of the set first reference set range and third reference set range.

Based on the output voltage Vout belonging to the first reference set range, the foreign object detector 154 detects that the wireless power receiving apparatus 180 is disposed on the charging pad.

The operator 152 switches, based on the foreign object detector 154 detecting that the wireless power receiving apparatus 180 is placed on the charging pad, from the detecting mode to the charging mode as shown in FIG. 5B. Subsequently, when switching to the charging mode, the operator 152 operates the switch 132 to switch on so that the driving power Vac output by the switching inverter 124 is transmitted to the resonance capacitor C and the transmitting coil L.

Subsequently, the transmitter 140 can transmit the wireless power signal P corresponding to the first resonance value based on the capacitance of the resonance capacitor C and the inductance of the transmitting coil L to charge the wireless power receiving apparatus 180.

In order to detect whether the foreign object is disposed on the charging pad during charging of the wireless power receiving apparatus 180, the operator 152 switches to the charging mode and operates the switch 132 to switch on to maintain the charging mode and operates the switch 132 to switch off to switch to the detection mode. The modes are repeatedly switched at set time intervals.

Subsequently, the foreign object detector 154 can detect whether the foreign object is disposed based on the output voltage Vout detected at the node point n1.

The foreign object detector 154 can detect that, based on the output voltage Vout detected during charging of the wireless charging receiving apparatus 180 belonging to the second reference set range, the foreign object is additionally disposed on the charging pad.

In this case, the foreign object detector 154 can emit, based on the foreign object being placed on the charging pad, the LED light to outside.

In FIG. 5A, the foreign object detector 154 can detect that, based on the output voltage Vout belonging to the third reference set range, only the foreign object is disposed on the charging pad.

At this time, the foreign object detector 154 emits the LED light to outside. The operator 152 can operate the switch 132 to switch on and the inverter 124 at set time intervals so that the detecting mode is maintained, and the driving power Vac can be supplied to the variable capacitor 134.

According to the present disclosure, whether the foreign object is disposed on the charging pad can be detected even during charging of the wireless power receiving apparatus 180.

The circuit diagram showing the resonator variable portion, the transmitter, and the controller in FIG. 5 is only an example, and is not limited thereto.

Figure 6A:
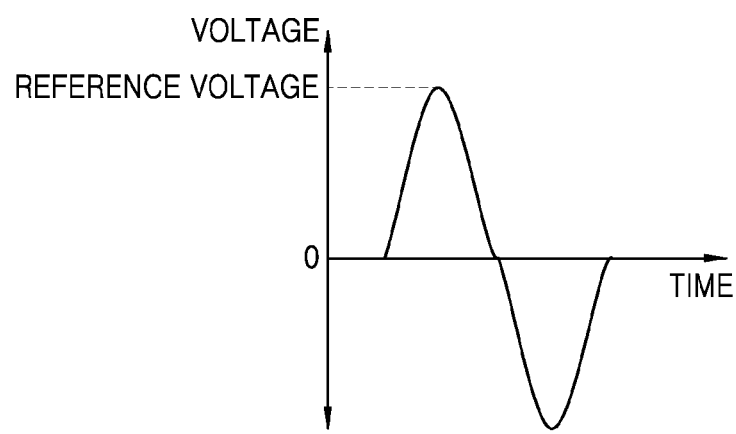
FIGS. 6A to 6E are voltage waveform diagrams showing output voltage at a node point in FIGS. 4A and 4B and a first reference voltage range and a third reference voltage range.
Figure 6B:
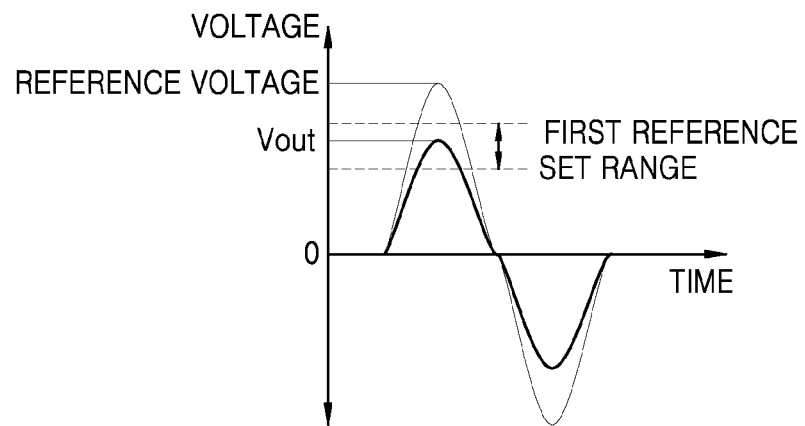

FIG. 6A shows a reference voltage for a foreign object detection signal S determined based on both a wireless power receiving apparatus 180 and a foreign object being not disposed on a charging pad. FIG. 6B shows an output voltage Vout and a reference voltage for a foreign object detection signal S determined based on only the wireless power receiving apparatus 180 being only disposed on a charging pad.

As shown in FIG. 6B, the foreign material detector 154 determines whether the output voltage Vout belongs to the first reference set range, and detects whether the wireless charging receiving apparatus 180 is disposed on the charging pad.

Figure 6C:
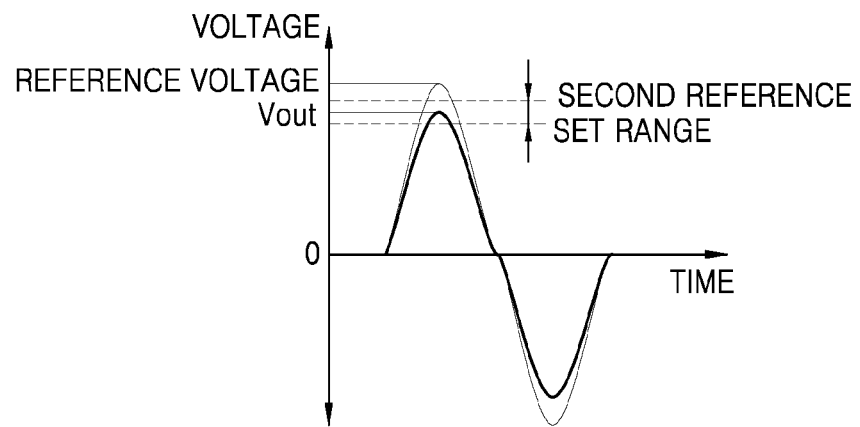

FIG. 6C shows an output voltage Vout and a reference voltage for the foreign object detection signal S determined based on both the wireless power receiving apparatus 180 and the foreign object disposed on the charging pad.

As shown in FIG. 6C, the foreign object detector 154 determines whether the output voltage Vout belongs to a second reference set range and can detect whether the wireless charging receiving apparatus 180 and the object are disposed on the charging pad.

Figure 6D:
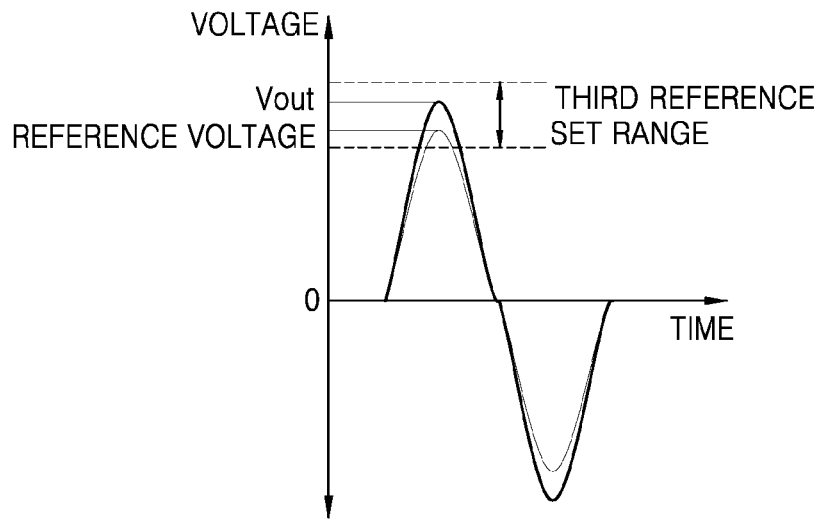

FIG. 6D shows an output voltage Vout and a reference voltage with respect to a foreign object detection signal S determined based on a foreign object disposed on a charging pad.

As shown in FIG. 6D, the foreign object detector 154 can determine whether the output voltage Vout belongs to a third reference set range to detect whether the foreign object is disposed.

Figure 6E:
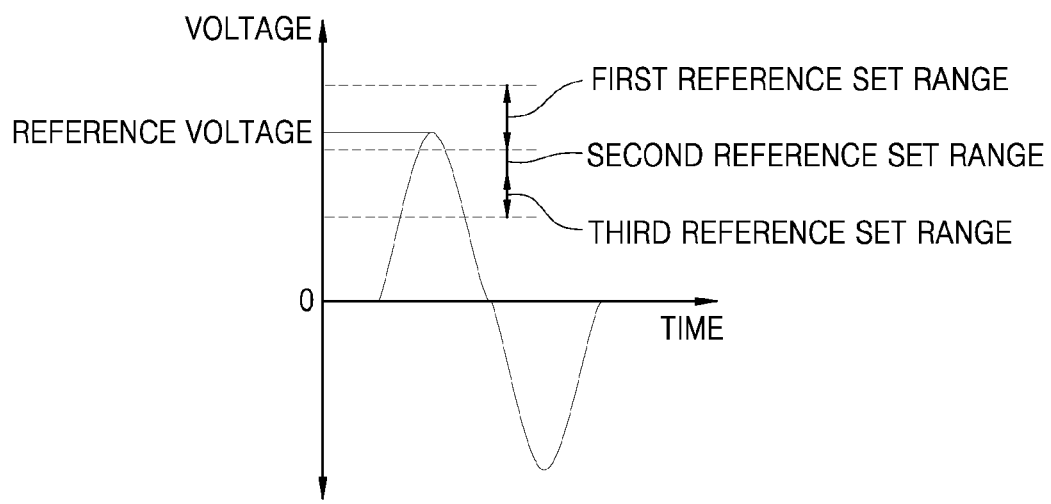

FIG. 6E is a schematic view showing a first reference set range and a third reference set range compared to a reference voltage.

FIGS. 6A to 6E are waveform diagrams showing a foreign object detection signal S based on time and voltage, and the foreign object detector 154 can only quantify peak values of the output value and can determine whether the quantified peak values of the output value belongs to the first reference set range to the third reference set range, which are previously stored, but the present disclosure is not limited thereto.

FIGS. 7A to 9B show simulation results of signal interference occurring during simultaneous operation in multi-coil systems according to one or more examples of the present disclosure.

Figure 7A:
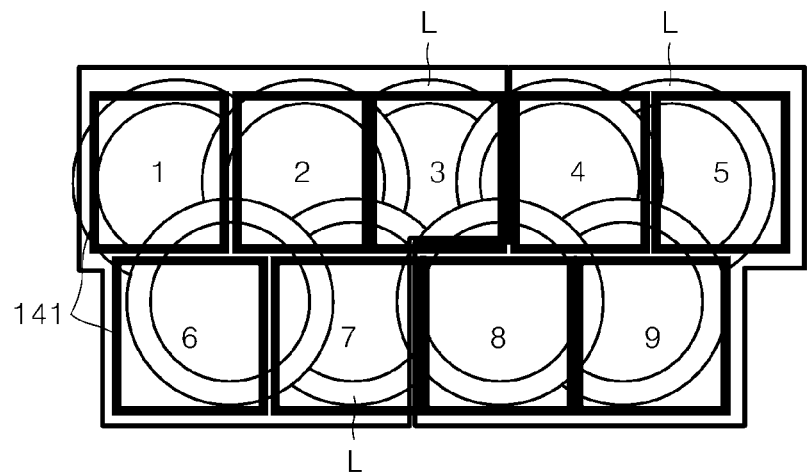
FIGS. 7A to 9B show simulation results of signal interference occurring during simultaneous operation in a multi-coil system.

FIG. 7A shows an example structure of a multi-coil based wireless charging system. A transmitting coil L can include two or more transmitting coils L and a resonance loop 141 can include two or more resonance loops 141. In some examples, a first transmitting coil L, a second transmitting coil L, a third transmitting coil L, a sixth transmitting coil, and a seventh transmitting coil L among transmitting coils perform operation of detecting the receiver and the foreign matter a fourth transmitting coil L, a fifth transmitting coil L, an eight transmitting coil L, and a ninth transmitting coil L of the transmitting coils perform the wireless charging operation.

Figure 7B:
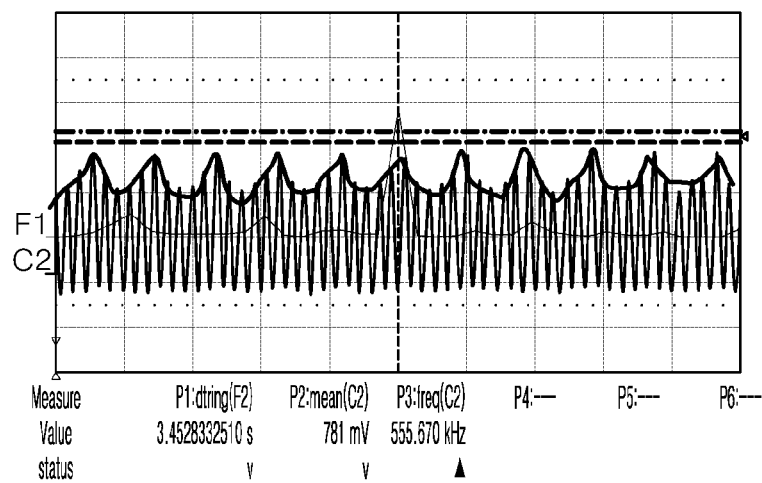

At this time, the foreign object detection signal S transmitted by the first transmitting coil L, the second transmitting coil L, the third transmitting coil L, the sixth transmitting coil L and the seventh transmitting coil L, as shown in FIG. 7B, may become unstable as a wireless charging signal is induced, thereby affecting sensitivity of detecting the receiver and the foreign object of the wireless charging system. Accordingly, in contrast to 1:1 wireless charging, N:N multiple wireless charging may cause a problem in stabilization of the detection signal.

Figure 7C:
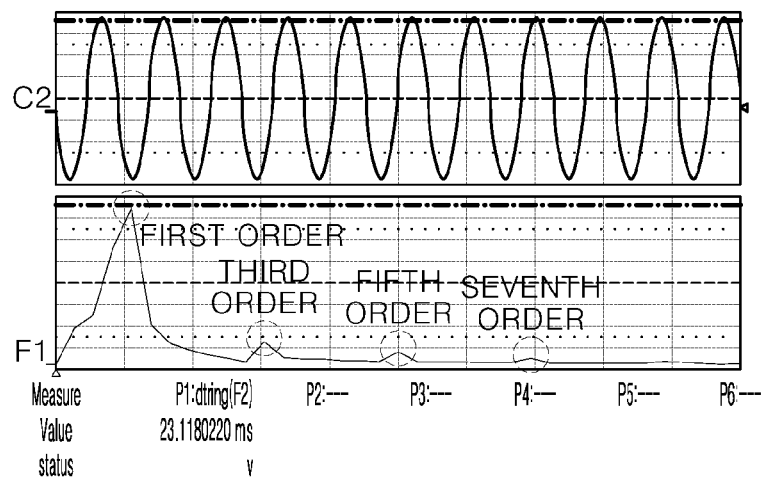

As shown in FIG. 7C, the wireless power signal P transmitted by the fourth transmitting coil, a fifth transmitting coil, an eighth transmitting coil, and a ninth transmitting coil has a high-order component, and the higher the order, the less the magnitude. In the N: N multiple wireless charger, the voltage induced to the coil during wireless charging is very high and a signal used for detecting the transmitter and the foreign object has a low value. That is, the N: N multiple wireless chargers are undetectable due to interference of signals coming from other wireless charging terminals, thereby causing a problem in stabilization of the detection signal in conditions in which the signal is induced between the two coils with a low level.

Figure 8A:
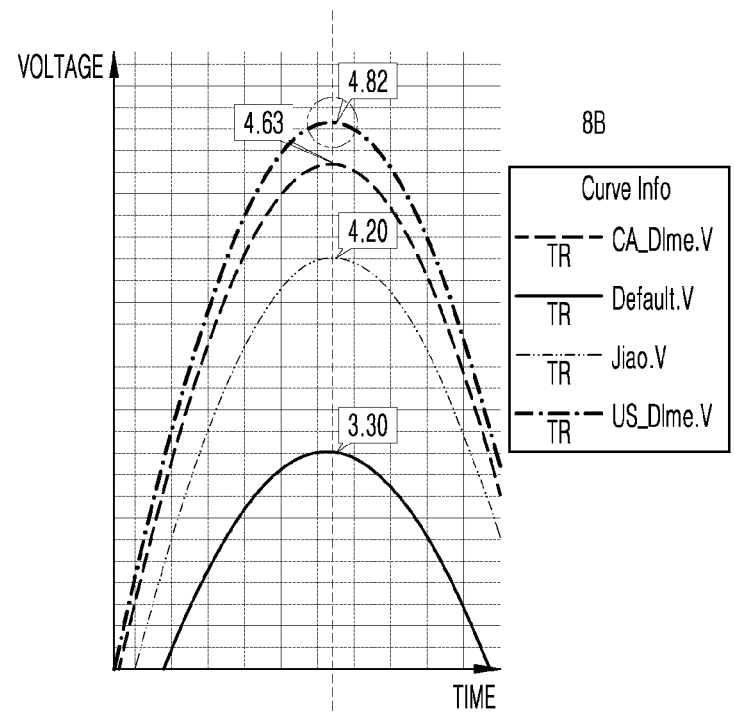
Figure 8B:
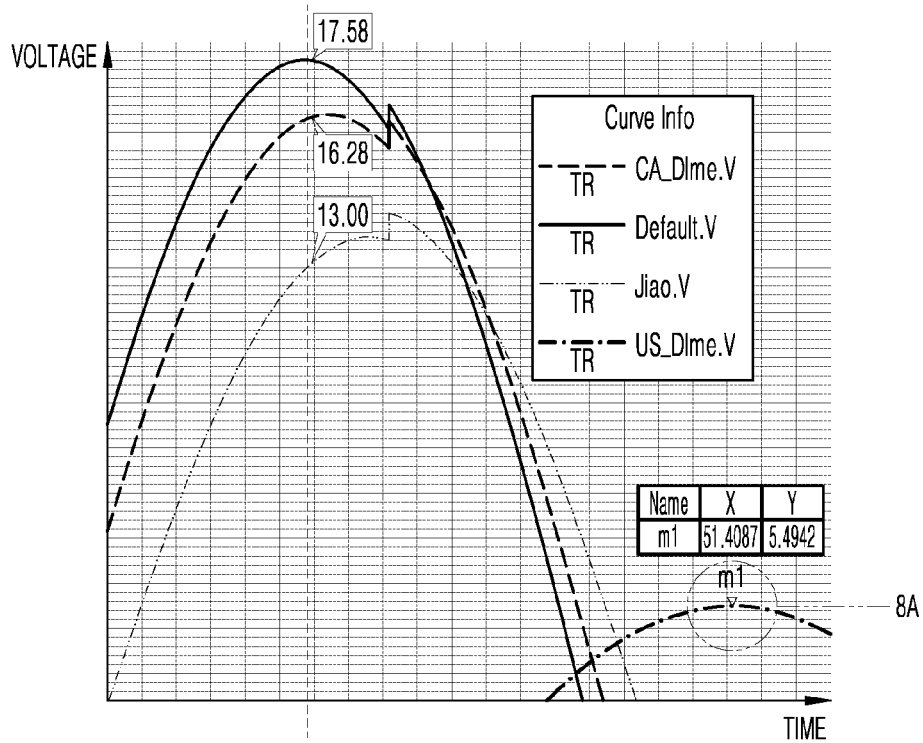

FIGS. 8A and 8B show graphs corresponding to a problem. As shown in FIG. 8A, in the presence of a transmitting coil Rx, the foreign object can be determined based on a voltage value increased due to the foreign object.

However, as shown in FIG. 8B, the more sensitive the foreign object, the higher the voltage. At this time, if a signal S used for detecting the foreign object has a voltage being not different from or less than a condition voltage only in the presence of the transmitting signal of the transmitter, the foreign matter is undetectable in the absence of the transmitting signal Rx.

Figure 9A:
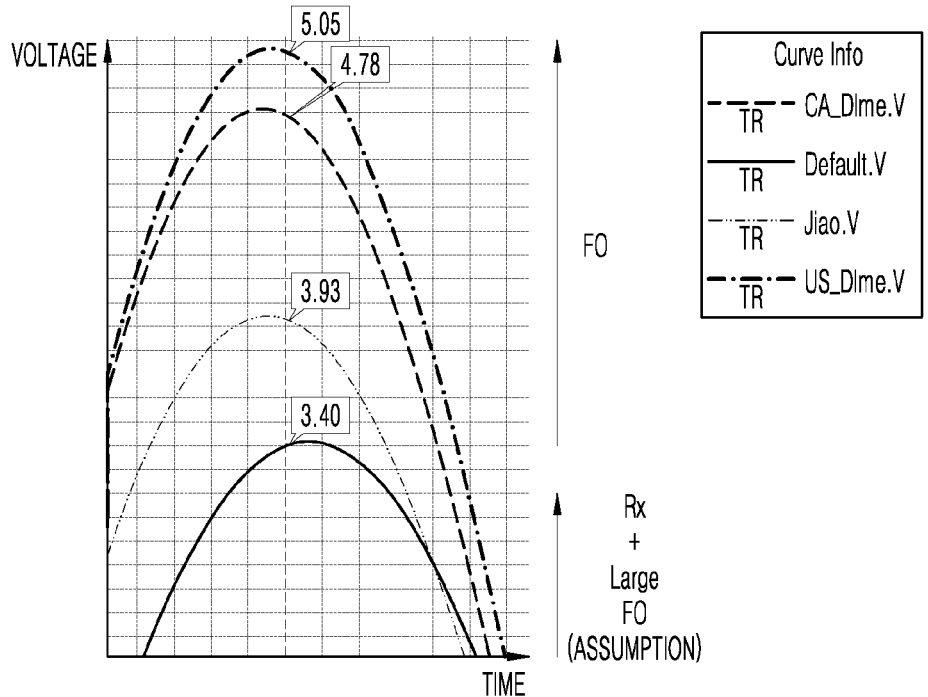
Figure 9B:
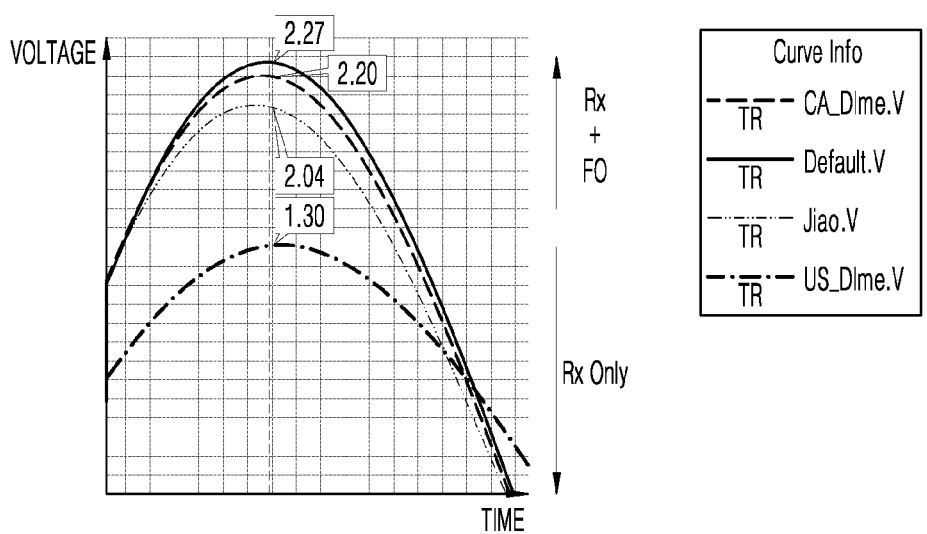

FIGS. 9A and 9B show graphs provided by an apparatus of the present disclosure to solve the problem of FIGS. 8A and 8B. As shown in FIG. 9A, the foreign object can be determined in the presence of the transmitting coil Rx based on the voltage value increased due to the foreign object.

In some examples, as shown in FIG. 9B, the foreign matter detection signal S can be determined in the absence of the transmitting coil Rx as the voltage corresponding to the signal S used for detecting the foreign object is greatly different from the condition voltage determined in the presence of the transmitting signal of the transmitter only.

Various substitutions, modifications, and changes can be made within the scope that may not deviate from the technical idea of the present disclosure for the skilled person in the art to which the present disclosure pertains, the above-mentioned disclosure is not limited to the above-mentioned embodiment and the accompanying drawings.

Other embodiments are within the scope of the following claims.

What is claimed is:

1. A receiving coil and foreign object detecting apparatus comprising:
    a charger that transmits a foreign object detection signal to detect whether or not at least one of a wireless power receiving apparatus and a foreign object is disposed on a charging pad, and selectively transmits a wireless power signal to charge the wireless power receiving apparatus; and
    a controller that controls the charger so that the wireless power signal and the foreign object detection signal are transmitted, and detects, based on the foreign object detection signal, presence of at least one of the foreign object and the wireless power receiving apparatus based on an output voltage detected by the charger,
    wherein the charger comprises:
    a transmitter that transmits the wireless power signal and the foreign object detection signal, resonates a transmitting coil based on a first resonance value for transmitting the wireless power signal, and prevents a signal induced from neighboring other transmitting coils; and
    a resonance variable portion that varies the first resonance value to a second resonance value for transmitting the foreign object detection signal,
    wherein the transmitter comprises:
    the transmitting coil disposed on a substrate and configured to transmit the wireless power signal;
    a resonance loop disposed in an area of the transmitting coil; and
    an induced signal processor that prevents interference of the signal induced by the neighboring other transmitting coils,
    wherein the induced signal processor comprises a peak detection circuit,
    wherein the peak detection circuit comprises a diode and a capacitor connected to each other and has a period of a signal for detection that is longer than a detected voltage observation time to have a maximum value of a frequency of the signal for detection as a representative value of the frequency of the signal for detection.

2. The receiving coil and foreign object detecting apparatus of claim 1, wherein the observation time is set differently based on a magnitude of a wireless charging signal.

3. The receiving coil and foreign object detecting apparatus of claim 1, wherein the induced signal processor comprises a high pass filter in which a capacitor and a resistor are connected to each and configured to block a wireless charging signal and pass a detection signal.

4. The receiving coil and foreign object detecting apparatus of claim 3, wherein the high pass filter has an operation frequency that is less than a detection signal frequency.

5. The receiving coil and foreign object detecting apparatus of claim 1, wherein the induced signal processor sets a wireless charging signal to have a frequency less than a frequency of a detection signal.

6. The receiving coil and foreign object detecting apparatus of claim 5, wherein the detection signal is set to have a frequency at least two times a frequency of the wireless charging signal.

7. The receiving coil and foreign object detecting apparatus of claim 5, wherein the detection signal is set to have a frequency not identical to a high-order frequency of the wireless charging signal.

8. The receiving coil and foreign object detecting apparatus of claim 1, wherein the resonance loop comprises a resonance coil having a loop structure and configured to concentrate a signal generated by the transmitting coil and a capacitor that resonates at a specific frequency.

9. The receiving coil and foreign object detecting apparatus of claim 1, wherein the resonance loop uses a frequency band that is higher than a frequency used to charge the wireless power receiving apparatus when the foreign object is detected.

10. The receiving coil and foreign object detecting apparatus of claim 1, wherein the resonance variable portion comprises:
    a switch configured to switch so that the wireless power signal or the foreign object detection signal is transmitted; and
    a variable capacitor that is connected to the switch and varies the first resonance value to the second resonance value based on the switch performing a switching-off operation.

11. The receiving coil and foreign object detecting apparatus of claim 10, wherein the variable capacitor has a capacitance value less than a capacitance value of a resonance capacitor.

12. The receiving coil and foreign object detecting apparatus of claim 10, wherein the controller comprises:
    an operator that operates the switch so that the wireless power signal or the foreign object detection signal is transmitted; and
    a foreign object detector that detects, based on transmitting the foreign object detection signal, presence of at least one of the foreign object and the wireless power receiving apparatus based on the output voltage detected between a resonance capacitor and the transmitting coil.

13. The receiving coil and foreign object detecting apparatus of claim 12, wherein the operator operates the switch to switch on and off so that at least one of the wireless power signal and the foreign object detection signal is transmitted with set time intervals.

14. The receiving coil and foreign object detecting apparatus of claim 12, wherein the operator operates, based on the foreign object detector detecting the wireless power receiving apparatus, the switch to switch on so that the wireless power signal is transmitted, and subsequently, the operator repeats switching-on and switching-off operation at set time intervals to detect the foreign object.

15. The receiving coil and foreign object detecting apparatus of claim 12, wherein based on whether the foreign object is present on the charging pad, the wireless power receiving apparatus is present on the charging pad, and both the foreign object and the wireless power receiving apparatus are present on the charging pad, the foreign object detector sets output voltages to be in reference set ranges.

16. The receiving coil and foreign object detecting apparatus of claim 15, wherein the output voltage has a set range in which the reference set range determined in the presence of the foreign object on the charging pad is greater than the reference set range determined in the presence of the wireless power receiving apparatus on the charging pad, and
    the output voltage has a set range in which the reference set range determined in the presence of the foreign object and the wireless power receiving apparatus on the charging pad is greater than the reference set range determined in the presence of the wireless power receiving apparatus on the charging pad.

17. The receiving coil and foreign object detecting apparatus of claim 12, wherein the foreign object detector emits a light emitting diode (LED) light or provides another indication based on the foreign object detector detecting presence of the wireless power receiving apparatus and the foreign object.

18. The receiving coil and foreign object detecting apparatus of claim 12, wherein, based on the foreign object detector detecting presence of the foreign object, the switch is switched on so as to prevent transmission of the wireless power signal.

* * * * *